United States Patent
Yaniv (12)

(10) Patent No.: US 6,577,355 B1
(45) Date of Patent: Jun. 10, 2003

(54) SWITCHABLE TRANSPARENT SCREENS FOR IMAGE PROJECTION SYSTEM

(75) Inventor: Zvi Yaniv, Austin, TX (US)

(73) Assignee: SI Diamond Technology, Inc., Austin, TX (US)

(*) Notice: Subject to any disclaimer, the term of this patent is extended or adjusted under 35 U.S.C. 154(b) by 0 days.

(21) Appl. No.: 09/519,537

(22) Filed: Mar. 6, 2000

(51) Int. Cl.⁷ .................. G02F 1/1335; G03B 21/56
(52) U.S. Cl. ........................... 349/16; 359/443
(58) Field of Search ............... 349/11, 16, 193; 359/443, 460

(56) References Cited

U.S. PATENT DOCUMENTS

| | | | | |
|---|---|---|---|---|
| 5,123,192 A | * | 6/1992 | Hsieh | 40/442 |
| 5,175,637 A | * | 12/1992 | Jones et al. | 359/48 |
| 5,416,617 A | * | 5/1995 | Loiseaux et al. | 359/51 |
| 5,784,138 A | * | 7/1998 | Kollarits et al. | 349/93 |

OTHER PUBLICATIONS

J. W. Doane et al., *Displays from a New Type of Liquid Crystal Microdroplet Dispersion,* IEEE, 1985 International Display Research Conference, pp. 153–154 (1985).
J. W. Doane et al., *Wide–Angle–View PDLC Displays,* SID 90 Digest, pp. 224–226 (1990).
Z. Yaniv et al., *Active Matrix Polymer Dispersed Liquid Crystal Display,* Japan Display, pp. 572–575 (1989).

* cited by examiner

*Primary Examiner*—Robert H. Kim
*Assistant Examiner*—Andrew Schechter
(74) *Attorney, Agent, or Firm*—Kelly K. Kordzik; Winstead Sechrest & Minnick P.C.

(57) ABSTRACT

An image projection system comprises an image projector, such as a film or television projector and a projection screen. The projection screen is fabricated of a substantially transparent material, such as glass or plastic. The screen of transparent material has one or more areas or portions formed therein which areas or portions may be made to be translucent upon the application of a stimulus. Once in a translucent condition, the projected image can be received and viewed on the translucent portion.

14 Claims, 1 Drawing Sheet

SWITCHABLE TRANSPARENT SCREENS FOR IMAGE PROJECTION SYSTEM

TECHNICAL FIELD

The present invention is generally related to the field of image projection systems, and more particularly to the use of transparent screens adapted to have at least switchable portions, said switchable portions capable of switching from a transparent to a translucent condition.

BACKGROUND INFORMATION

When projecting an image in an audience space, the aim is to give the image formed on a projection screen a homogeneous and large brightness in a limited part of the audience space, viz. only in the space where the audience is present. In this way the available radiation energy can be optimally utilized for the image observed by the audience. The part of the space where the audience is present is, however, a relatively limited part and has different dimensions in the vertical and horizontal directions. In the horizontal direction the viewing angle should be as large as possible, whereas the vertical viewing angle is generally much smaller. To realize the different viewing angles, the image projection screen may be provided with means which ensure a horizontal spread and means which ensure a vertical spread of the light.

In the context of using a projection screen for projecting, e.g., advertising information, the drawbacks associated with conventional screens are manifold and readily apparent. Such screens are large, bulky, costly, and take up much space that could readily be used for many other purposes. Moreover, such screens are adapted for an image to be projected onto only one side of the screen, and the back side is useless. Ideally, one would like to take advantage of space that was already being used for other purposes, and employ that space for projecting advertising purposes at appropriate times. One such space that answers to this description is glass windows. Windows in, for example, commercial retail establishments take up large amounts of real estate, but have relatively limited functionality. While true that windows do provide the function of letting light in and allowing patrons to look inside, at times when the establishment is closed, the windows function as no more than a barrier to outside elements. Unfortunately, windows cannot be employed as the screen onto which information, e.g., advertising, can be projected. The reasons for this are readily appreciated: glass is transparent, and hence an image projected onto it is not "held" on the glass, but rather passes through it.

In general, projection screens are opaque screens, which light cannot pass through. Projection screens are generally classified into a front projection screen (reflection type) and a rear projection screen (transmission type). The rear projection screen is very useful because it enables one to compactly constitute a projection apparatus for simply projecting a film for slide, microfiche, 8 mm and 16 mm cinefilms. In addition, the rear projection screen is also useful as a large scale screen for video projectors which draw attention in this information oriented age.

Heretofore, most rear projection screens have been so-called coating type screens which are produced by coating a transparent or semitransparent support with a pigment, glass powders, synthetic resin spheres, aluminum metal powders and the like dispersed in a vehicle. Other types of rear projection screens having some other advantages, i.e. rear projection screens utilizing light scattering effect caused by crystalline particles formed in a crystalline high polymer material, are also known, for example, as shown in Japanese Utility Model Publication No. 14236/1968 and Japanese Patent Publication No. 192574/1973.

One of the principle drawbacks associated with projection screens of any type are the relatively large amounts of space they occupy, both in terms of wall space and floor space. For example, conventional projection screens have dimensions of approximately five feet square. While such screens may be stored, even such portable screens are large, bulky, and not easily moved.

Alternatively, stationary screens, such as the larger screens that mechanically retract into the ceiling of a room, are both expensive, and subject to periodic malfunction, usually in times of greatest need. In such situations, a presenter is usually forced to project images onto a bare wall which may be covered by dark colored paint or patterned wallpaper. In either situation, the resulting image is, at best, of poor quality.

Accordingly, there exists a need for a new type of projection screen that takes advantage of the large areas of space already available in many commercial establishments. This new type of projection screen and related system should be highly reliable, not needing to us the bulky mechanical systems of the prior art. Moreover, such a system should be relatively inexpensive, and allow the user multiple applications. These and other advantages of the system will be described in detail hereinbelow.

SUMMARY OF THE INVENTION

The present invention addresses the foregoing need by providing a projection screen made of glass or some other transparent material, such as plastic, having one or more switchable portions. The switchable portions may be switched from a transparent mode to an opaque mode and vice versa. When in the transparent mode, an image projected thereon will merely pass through. However, when in the opaque mode, the image projected from a projector onto the screen will be reflected by the opaque portion of the screen.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
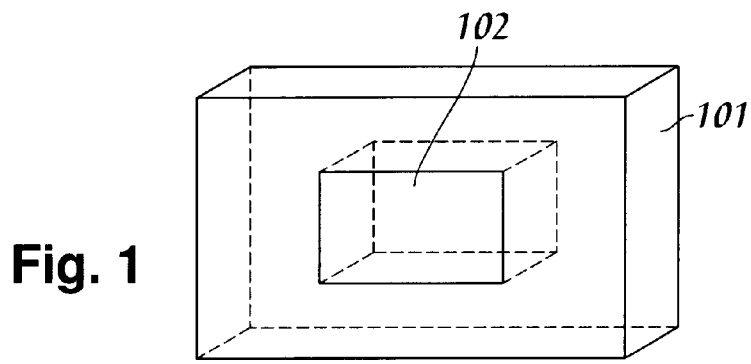
FIG. 1 illustrates a prospective view of a projection screen in accordance with the present invention.

In the following description, numerous specific details are set forth such as specific materials to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

While the specification concludes with claims defining the features of the invention that are regarded as novel, it is believed that the invention will be better understood from a consideration of the following description in conjunction with the drawing figures, in which like reference numerals are carried forward.

Figure 3:
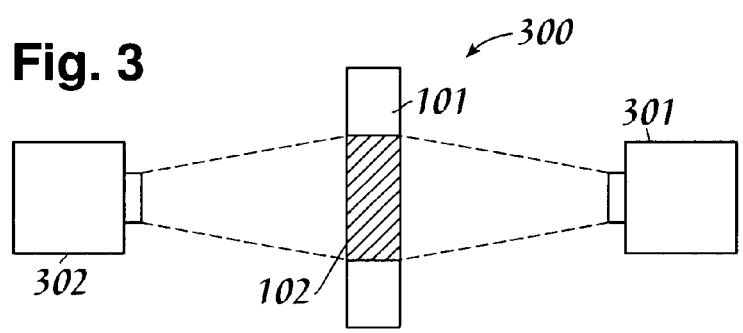
FIG. 3 is a side view of an image projection system, in accordance with the instant invention.

Referring now to FIG. 3, there is illustrated therein a cross-sectional side view of the image projection system 300 of the instant invention. The system 300 comprises a projector 301 of any type commonly used, examples of which include an LCD projector, a television projector currently used on conventional projection television systems, a film projector, a slide projector or a computer for providing computer generated images, to name but a few. The system 300 further includes a projection screen 101. However, the projection screen herein is a glass or other transparent material, having one or more switchable portions. More particularly, the screen 101 may comprise a sheet of glass having a portion 102 or portions that can be switched between the glass's typical transparent characteristic, to a translucent appearance or condition. Projector 301 may project an image onto portion 102, which will be viewable by viewers on the right side of screen 101 when portion 102 is opaque. Alternatively, when portion 102 is opaque, another projector 302 can be used to project an image onto the other side of screen 101 so that such an image is viewable by viewers on the left side of screen 101.

As is readily apparent, light, as from a projected image, projected onto a sheet of glass or other transparent material leaves no readily viewable impression. This is due of course to the fact that the projected light passes substantially unimpeded through the glass. Accordingly, heretofore retail establishments, for example, having large areas of display glass windows were forced to post paper sign advertising, for example, an on-going sale. This type of advertising is neither dynamic, nor particularly effective. Conversely, an advertising scheme taking advantage of the projection system described herein has many advantages. In particular, by projecting an image onto the translucent area of the glass substrate, the projected image is visible by viewers on both sides of the glass. Moreover, while only a portion of the glass or other substrate may by switchable between the transparent and the translucent condition, the whole of the substrate may in fact be switchable. This allows a condition in which, for example, a glass pane becomes an entire wall of e.g., advertising area.

Figure 2:
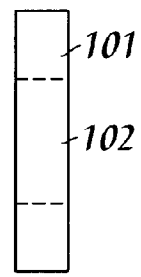
FIG. 2 illustrates a side view of the projection screen shown in FIG. 1.

Referring now to FIGS. 1 and 2, the transparent screen 101 may be a glass panel such as a display window, or some other type of transparent medium. Examples of such transparent medium include various types of plastics, cast or fabricated as plastic sheets. The switchable portion 102 switches between the transparent state, which is unsuitable for the receipt of a projected image, to a translucent or opaque state which will readily receive a projected image.

The switchable portion 102 may be provided by equipping the transparent screen 101 with an electrical, chemical or photosensitive material which is transparent in the absence of a stimulus, but switches to an opaque state upon receipt of a particular stimulus. Examples of electrochromic, photochromic, and electrophoretic materials which may be advantageously employed in this function are well known to those of ordinary skill in the art. For example, a polymer dispersed liquid crystal material as is commonly available may be sandwiched between sheets of glass or plastic in one or more portions of a transparent sheet. As oriented in the standard configuration, the molecules of liquid crystal material will allow for the passage of light therethrough, i.e., the portion is transparent. However, upon application of a relatively small electrical stimulus, the molecules of liquid crystal material may be made to change their orientation, thus taking on an opaque appearance and making the opaque area of the transparent sheet suitable for the receipt of a projected image. Such switchable materials are disclosed within J. W. Doane et al., *Displays from a New Type of Liquid Crystal Microdroplet Dispersion,* IEEE, 1985 International Display Research Conference, pp. 153-154 (1985); J. W. Doane et al., *Wide-Angle-View PDLC Displays,* SID 90 DIGEST, pp. 224-226 (1990); Z. Yaniv et al., *Active Matrix Polymer Dispersed Liquid Crystal Display,* JAPAN DISPLAY, pp. 572-575 (1989), which are all incorporated by reference herein.

Figure 4:
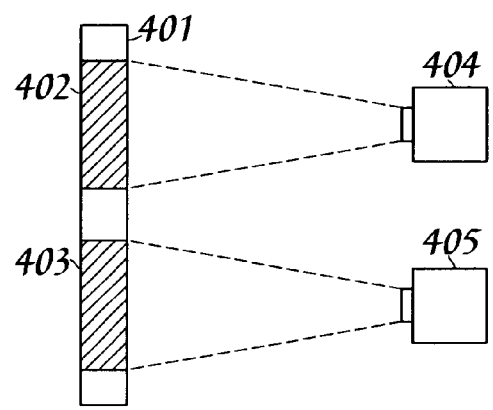
FIG. 4 illustrates an alternative embodiment of the present invention.

While FIGS. 1, 2 and 3 illustrate but a single switchable portion 102 on the transparent sheet 101, it is to be understood that the invention is not so limited. For example, and as is illustrated in FIG. 4, a plurality of image projectors 404, 405 may be used to provide a plurality of projected images onto a plurality of switchable portions 402, 403 of a transparent sheet 401 or plural sheets. Such an embodiment would have great utility in, for example, retail settings.

In yet another embodiment, two or more portions may be arranged in an overlapping relationship. This overlapping relationship may be either a situation in which two portions directly overlay one another, or partially do so. If two overlay one another completely, such a configuration may be employed to allow images to be projected in differing light conditions. For example, the first portion may be a darker translucent portion for better image quality in a first set of light conditions, while the second portion may be a lighter translucent portion adapted for a second set of light conditions. Each of the portions would of course be independently controllable.

Although the present invention and its advantages have been described in detail, it should be understood that various changes, substitutions and alterations can be made herein without departing from the spirit and scope of the invention as defined by the appended claims.

What is claimed is:

1. An image projection system comprising an image projecting means and an image receipt screen, said screen comprising a substantially transparent medium having at least one portion switchable between a substantially transparent optical characteristic and a substantially opaque optical characteristic, wherein said switchable portion comprises a light reactive chemical.

2. The image projection system as in claim 1, wherein substantially all of said transparent medium is switchable.

3. The image projection system as in claim 1, wherein said transparent medium is glass.

4. The image projection system as in claim 1, wherein said transparent medium is plastic.

5. The image projection system as in claim 1, wherein said system is used in advertising.

6. The image projection system as in claim 1, further comprising a plurality of image projecting means for projecting a plurality of images onto a plurality of switchable portions.

7. The image projection system as in claim 6, wherein said plurality of switchable portions are co-located on a single transparent medium.

8. The image projection system as in claim 1, wherein said system is used in a video image projection system.

9. The image projection system as in claim 1, wherein said system is used in a television image projection system.

10. The image projection system as in claim 1, wherein said system is used in a computer-generated image projection system.

11. The image projection, system as in claim 1, wherein said at least one switchable portion comprises at least first and second independently switchable portions disposed adjacent one another.

12. The image projection system as in claim 11, wherein said first and second portions are at least partially overlapping.

13. An image projection system comprising an image projecting means and an image receipt screen, said screen comprising a substantially transparent medium having at least one portion switchable between a substantially transparent optical characteristic and a substantially opaque optical characteristic, wherein said switchable portion comprises a photosensitive material.

14. An image projection system comprising an image projecting means and an image receipt screen, said screen comprising a substantially transparent medium having at least one portion switchable between a substantially transparent optical characteristic and a substantially opaque optical characteristic, wherein said at least one switchable portion comprises at least first and second independently switchable portions disposed adjacent one another, wherein said first and second independently switchable portions are each adapted for a different lighting condition.

* * * * *